(12) United States Patent
Ballard

(10) Patent No.: US 11,947,696 B2
(45) Date of Patent: Apr. 2, 2024

(54) FILE SYSTEM CONTENT OBFUSCATION IN HIGH SECURITY ENVIRONMENTS

(71) Applicant: EMC IP Holding Company LLC, Hopkinton, MA (US)

(72) Inventor: Barbara Ballard, Needham, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 175 days.

(21) Appl. No.: 17/378,216

(22) Filed: Jul. 16, 2021

(65) Prior Publication Data
US 2023/0017368 A1    Jan. 19, 2023

(51) Int. Cl.
  *G06F 16/16* (2019.01)
  *G06F 16/13* (2019.01)
  *G06F 21/60* (2013.01)
  *G06F 21/62* (2013.01)

(52) U.S. Cl.
  CPC ........ *G06F 21/6218* (2013.01); *G06F 16/164* (2019.01); *G06F 21/602* (2013.01)

(58) Field of Classification Search
  None
  See application file for complete search history.

(56) References Cited

U.S. PATENT DOCUMENTS

| 5,761,683 A * | 6/1998 | Logan ................ G06F 16/9577 715/208 |
| 5,802,299 A * | 9/1998 | Logan ................ G06F 16/9577 715/251 |
| 6,272,593 B1 * | 8/2001 | Dujari .................... G06F 21/51 726/33 |
| 2009/0097821 A1 * | 4/2009 | Yahata .................. G11B 27/10 386/356 |

FOREIGN PATENT DOCUMENTS

CN    112231717 A  *  1/2021  ............. G06F 21/31

OTHER PUBLICATIONS

Obfuscated Malware Detection Using API Call Dependency. Kumar. ACM. (Year: 2012).*
Bypassing DRM protection in e-book applications on Android. Lee. IEEE. (Year: 2018).*
"3.3.5.10 Receiving an SMB_COM_RENAME Request", Oct. 1, 2020, [https://learn.microsoft.com/en-us/openspecs/windows_protocols/ms-cifs/Sd30e1e2-4a1a-40de-8579-2143f1574dab], retrieved Nov. 27, 2023, 2 pages.

* cited by examiner

*Primary Examiner* — Venkat Perungavoor
(74) *Attorney, Agent, or Firm* — Amin, Turocy & Watson, LLP

(57) ABSTRACT

A system can receive, from user input, request data indicative of a request to create a file with a first filename. The system can, based on the request data, determining a second filename for the file. The system can store an association between the first filename and the second filename. The system can create the file in a file system with the second filename.

20 Claims, 11 Drawing Sheets

500

( 502 )

BASED ON RECEIVING USER REQUEST DATA INDICATIVE OF A REQUEST TO CREATE A FILE WITH A FIRST FILENAME, IDENTIFY A SECOND FILENAME FOR THE FILE 504

STORE AN ASSOCIATION BETWEEN THE FIRST FILENAME AND THE SECOND FILENAME 506

CREATE THE FILE IN A FILE SYSTEM WITH THE SECOND FILENAME 508

BASED ON RECEIVING DATA INDICATIVE OF A REQUEST TO CREATE A FILE WITH A FIRST FILENAME, IDENTIFY A SECOND FILENAME FOR THE FILE 604

↓

STORE AN ASSOCIATION BETWEEN THE FIRST FILENAME AND THE SECOND FILENAME 606

↓

CREATE THE FILE WITH THE SECOND FILENAME 608

RECEIVE SECOND REQUEST DATA INDICATIVE OF DISPLAY NAMES OF AT LEAST ONE FILE IN THE FILE SYSTEM, THE AT LEAST ONE FILE COMPRISING THE FIRST FILE 704

DETERMINE THAT A SETTING IS CONFIGURED TO DISPLAY ORIGINAL FILE NAMES 706

IN RESPONSE TO THE DETERMINING, RETRIEVE AN IDENTIFIER OF THE FIRST FILE, AND IDENTIFY THE FIRST FILENAME BASED ON THE ASSOCIATION BETWEEN THE FIRST FILENAME AND THE SECOND FILENAME 708

DISPLAY THE FIRST FILENAME AS PART OF DISPLAYING THE DISPLAY NAMES OF THE AT LEAST ONE FILE 710

RECEIVE SECOND REQUEST DATA INDICATIVE OF DISPLAY NAMES OF AT LEAST ONE FILE IN THE FILE SYSTEM, THE AT LEAST ONE FILE COMPRISING THE FIRST FILE 804

↓

DETERMINE THAT A SETTING IS CONFIGURED TO DISPLAY OBFUSCATED FILE NAMES 806

↓

IN RESPONSE TO THE DETERMINING, DETERMINE TO DISPLAY THE SECOND FILENAME FOR THE FILE RATHER THAN THE FIRST FILENAME FOR THE FILE 808

↓

RETRIEVE AN IDENTIFIER OF THE FIRST FILE 810

↓

DISPLAY THE SECOND FILENAME AS PART OF DISPLAYING THE DISPLAY NAMES OF THE AT LEAST ONE FILE 812

DISPLAY AN INDICATION OF AT LEAST ONE FILE IN A USER INTERFACE, THE AT LEAST ONE FILE COMPRISING THE FIRST FILE, AND THE AT LEAST ONE FILE BEING REPRESENTED WITH RESPECTIVE OBFUSCATED FILENAMES THAT COMPRISES THE SECOND FILENAME 1004

RECEIVE SECOND REQUEST DATA INDICATIVE CHANGING A SETTING TO DISPLAY RESPECTIVE ORIGINAL FILENAMES OF THE AT LEAST ONE FILE 1006

BASED ON THE SECOND REQUEST DATA, MODIFY THE USER INTERFACE FROM DISPLAYING THE RESPECTIVE OBFUSCATED FILENAMES OF THE AT LEAST ONE FILE TO DISPLAY THE RESPECTIVE ORIGINAL FILENAMES OF THE AT LEAST ONE FILE THAT COMPRISE THE FIRST FILENAME 1008

FILE SYSTEM CONTENT OBFUSCATION IN HIGH SECURITY ENVIRONMENTS

BACKGROUND

A computer file system can store data in the form of computer files. Information about files of a file system can be displayed in a user interface. This information can include a name of a file, a directory or file system path of the file, a user account that created the file or owns the file, and a size of the file.

A high security environment can include a computer system in which access to information about files is restricted to certain personnel.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive, from user input, request data indicative of a request to create a file with a first filename. The system can, based on the request data, determining a second filename for the file. The system can store an association between the first filename and the second filename. The system can create the file in a file system with the second filename.

An example method can comprise based on receiving user request data indicative of a request to create a file with a first filename, identifying, by a system comprising a processor, a second filename for the file. The method can further comprise storing, by the system, an association between the first filename and the second filename. The method can further comprise creating, by the system, the file in a file system with the second filename.

An example non-transitory computer-readable medium can comprise instructions that, in response to execution, cause a system comprising a processor to perform operations. These operations can comprise, based on receiving data indicative of a request to create a file with a first filename, identifying a second filename for the file. The operations can further comprise storing an association between the first filename and the second filename. The operations can further comprise creating the file with the second filename.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 5 illustrates another example process flow for file system content obfuscation in high security environments, in accordance with an embodiment of this disclosure;

FIG. 6 illustrates another example process flow for file system content obfuscation in high security environments, in accordance with an embodiment of this disclosure;

FIG. 7 illustrates an example process flow for displaying original names that can facilitate file system content obfuscation in high security environments, in accordance with an embodiment of this disclosure;

FIG. 8 illustrates an example process flow for displaying obfuscated names that can facilitate file system content obfuscation in high security environments, in accordance with an embodiment of this disclosure;

FIG. 10 illustrates an example process flow for switching from displaying obfuscated names to displaying original names that can facilitate file system content obfuscation in high security environments, in accordance with an embodiment of this disclosure;

DETAILED DESCRIPTION

Overview

Figure 1:
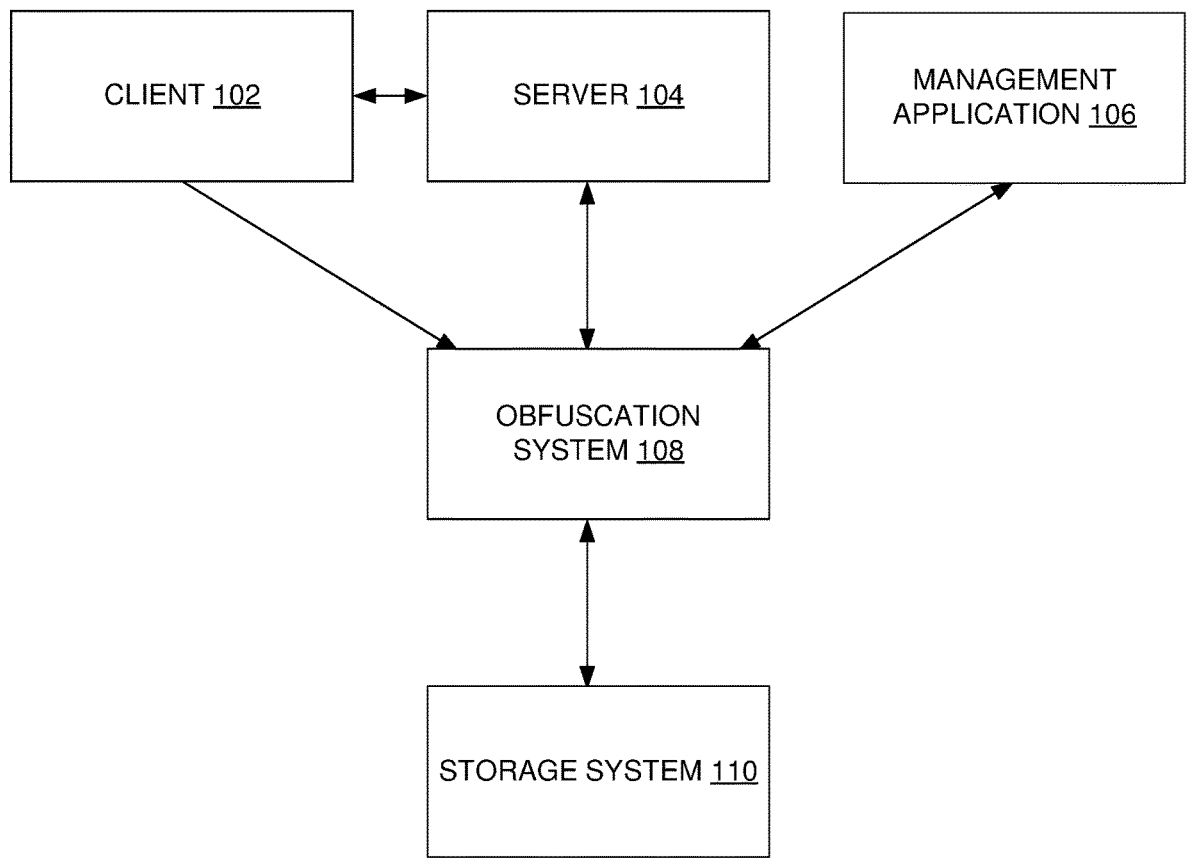
FIG. 1 illustrates an example system architecture that can facilitate file system content obfuscation in high security environments, in accordance with an embodiment of this disclosure.

The present techniques can be implemented to provide a second set of names for files in a directory. End uses can use their normal filenames for their daily work, and obfuscated names (sometimes referred to as "code names") for external communications, including in email, and in requests to an information technology (IT) department. An IT administrator's management application can, in turn, display code names. An end user can see his or her directory in a "normal" view, and in a "code name" view. An encrypted translation system can be used for folder names and paths, such that only people in special access groups can see names or contents of folders. IT administrators can manage a directory presented with code names as normal, with no loss of functionality or control.

In high security environments, end users can be banned from revealing even filenames or directory names to anyone without a need to know. Doing so can cost an end user his or her job. As a result, a burden of file system management administration can fall on end users so that they do not risk disclosing important information. This burden can involve needing to learn administrator tools. Other products can eliminate directory management from administrator tools, which can make administrating a system more challenging.

An IT administrator can need to provision, manage, and monitor file systems and their directories, ensuring that crucial data is kept up to data, protected, and constrained in its resource consumption. Some users, such as motion picture studios, or those users who are managing highly-sensitive environments, can need to restrict access to even names of directories to those with a "need to know." This list of those who have a need to know can omit an IT administrator, leaving these users without an effective way to allow professionals to manage their critical data assets.

File and directory names can contain sensitive information, as they are created by end users. Users can typically name files and directories to make a task of finding and recognizing a filename easy. This can put hints as to file content into the name of a file. Maintaining security protocols for every filename could result in an unacceptable negative impact to actually using a file system.

Thus, organizations can restrict file system visibility exclusively to those with a need to know, and that need to know can omit IT.

End users in a high-security environment can be required to manage file systems without IT support. Where IT administrators are prohibited from viewing file directories, a task of administering these systems can fall to end users who have both a security clearance and a right to know. These administration tasks can include protecting specific directories against human error, misuse, or technical failures; ensuring that file ecosystems comply with regulations and business rules including data retention; migrating file workloads between computer systems to ensure sufficient capacity; detailed control of file access; and usage optimization. These users can be required to perform IT administration functions when their skills lie elsewhere.

Administrators cannot see file system details with some storage products. Some products address a filename security issue by banning any IT user, at any organization, from viewing file system information. In some examples, only users who know an exact directory path can manage that directory, such as by placing a tree quota on the directory.

A solution to these issues of directory management in a high security environment can involve applying code names to files and directories to facilitate system management and collaboration between users with different security levels, while maintaining operational security and ease of use.

The present techniques can be used to implement an encrypted database for mapping directory names to automatically generated code names (or obfuscated names), allowing system administrators to do their normal tasks rather than relying on end users to make best IT decisions.

A codename (or obfuscation) database can comprise a table containing end user file (or directory) names and corresponding encoded names In some examples, a codename database comprises a hash of a file, where hashes can be compared to determine if a file has been changed without examining the contents of the file.

A file and directory name obfuscation system for high-security file system environments can be implemented according to the present techniques. An objective of such a system can be to permit system administrators to perform normal operations, such as provisioning and protection, without the ability to see any content in the file system itself. In some examples, the present techniques can be used to protect medical patient information, ensure that new movies or products are not revealed before launch, and to ensure that defense or state secrets remain secret.

The present techniques can provide for dynamic code name generation and decryption, language (obfuscated names) enabling users of different security clearances to collaboratively manage file systems and directories, and permitting end users to use their file systems normally.

In an example, a directory, "Trident Product Requirements" (an original name) can become encoded as "Gently Good" (an obfuscated name).

As used herein, obfuscated filenames and original filenames (as well as other obfuscated/original information) are described. An original filename can generally be a filename specified by a user for the file. An obfuscated name can be a system-generated name for a file, where the obfuscated name is used to store the file and to display information about the file, unless a setting to display original names is configured. In this way, the use of obfuscated names can be the default, and the use of possibly-sensitive original names can be restricted to circumstances where it is overtly determined to use original names.

Example Architecture

FIG. 1 illustrates an example system architecture 100 that can facilitate file system content obfuscation in high security environments, in accordance with an embodiment of this disclosure. In some examples, each of client 102, server 104, management application 106, obfuscation system 108, and storage system 110 can be implemented with one or more instances of computer 1102 of FIG. 11.

System architecture 100 comprises client 102, server 104, management application 106, obfuscation system 108, and storage system 110. Obfuscation system 108 can function to translate original names for files and directories used by an end user system to obfuscated names in storage system 110 where appropriate (e.g., there are examples where an end user is an administrator and is using obfuscated names rather than original names).

Client-side operations can be handles as follows. File read and write operations can go from client 102 and/or server 104, through obfuscation system 108 before being passed through to storage system 110. Obfuscation system 108 can switch a reference to a file or directory from a name that the end user utilizes to an obfuscated name that is recognized by storage system 110. Storage system 110 can then perform a file read or write (or other storage) operation using the obfuscated name.

In some examples, obfuscation system 108 encodes filenames before sending files to server 104.

End user operating systems, such as an operating system of client 102, can have a plug-in enabled to present obfuscated names in a user interface. In such examples, a user can right-click on a filename or directory name, and a menu item can be shown for "obfuscated name" along with the corresponding obfuscated name.

In another example, a browser-based interface can be implemented on obfuscation system 108. In such an example, an end user can see files and directory names based on his or her access privileges, alongside code names. This user interface can provide for invoking operations such as generating a new obfuscated name.

Admin-side operations can be handled as follows. After configuring obfuscation system 108, it can be that a storage administrator does not interact with a database of obfuscation system 108. It can be that access to that database requires security levels and need-to-know status that the administrator lacks.

An administrator can use a variety of administrator tools to manage files on storage system 110. In some examples, in addition to an obfuscated filename or directory name, an administrator can see and leverage other metadata, such as a department that owns the directory, access rights, file size, file creation data, last modified, number of files in a directory, state stored in a directory, etc. In some examples, an administrator is unable to see file contents.

With this metadata, an administrator can make decisions, such as which directories to migrate to an archive tier, which directories to store on high performance storage pools, configuring data protection, restoring files, etc.

In an example where an end user needs to discuss a specific file or directory with an administrator, the end user can look up and discuss the obfuscated name. Where this operation causes extra effort to an end user, it is less effort than needing to learn the skills of a file system administrator.

In some examples, administrators do not have access rights to the files. That is, actions are performed through administrator tools, and these tools point to the main storage system 110. In some examples, administrators do not create or edit files in high-security directories.

Name generation operations can be handled as follows. Directory names can be generated from word lists by obfuscation system 108. Example word lists include English adjectives, German adjectives, Bollywood film titles, Canadian town names, leading actor names, gerunds (-ing words), and English adverbs.

Names can be generated for files by randomly selecting from a variety of lists—e.g., a first word from List A, a second word from List B, a third word from List C, and appending a number. Lists can comprise publicly available word lists on themes. In some examples, additional lists can be uploaded by a customer. In some example, a system administrator can select word lists during configuration.

In some examples, built-in lists can be limited to "top 100" words to aid recognition by a broad audience. This can provide 10,000 combinations between two lists, before including numbers. Names that use three lists, or systems in which names can be pulled from two of several lists, scale naming combinations rapidly.

In some examples, filenames do not receive long text code names, while that is possible. An alternative can be to encode a file with a timestamp of when the file was created, along with a directory that the file belongs to. Where the file is moved, it can be renamed in the database.

Renaming files and directories can be handled as follows. End users of client 102 can move or rename files stored on storage system 110 in the normal course of their work. Where a file is renamed, an original name can change while an obfuscated name for the file can remain the same.

A file hash can be stored by obfuscation system 108. In a renaming scenario, an old file can disappear and a new file can be created. Before generating a new obfuscated name, a system can check to see if a hash signature on the new file matches a hash signature of a recently-deleted file. Where there is a match, the operation can become an update rather than a create and delete.

In some examples, protocol standards (such as a Common Internet File System (CIFS) protocol) can handle the operation before the operation reaches obfuscation system 108.

In some examples, a unique identifier for files can be pervasive through system infrastructure.

Figure 2:
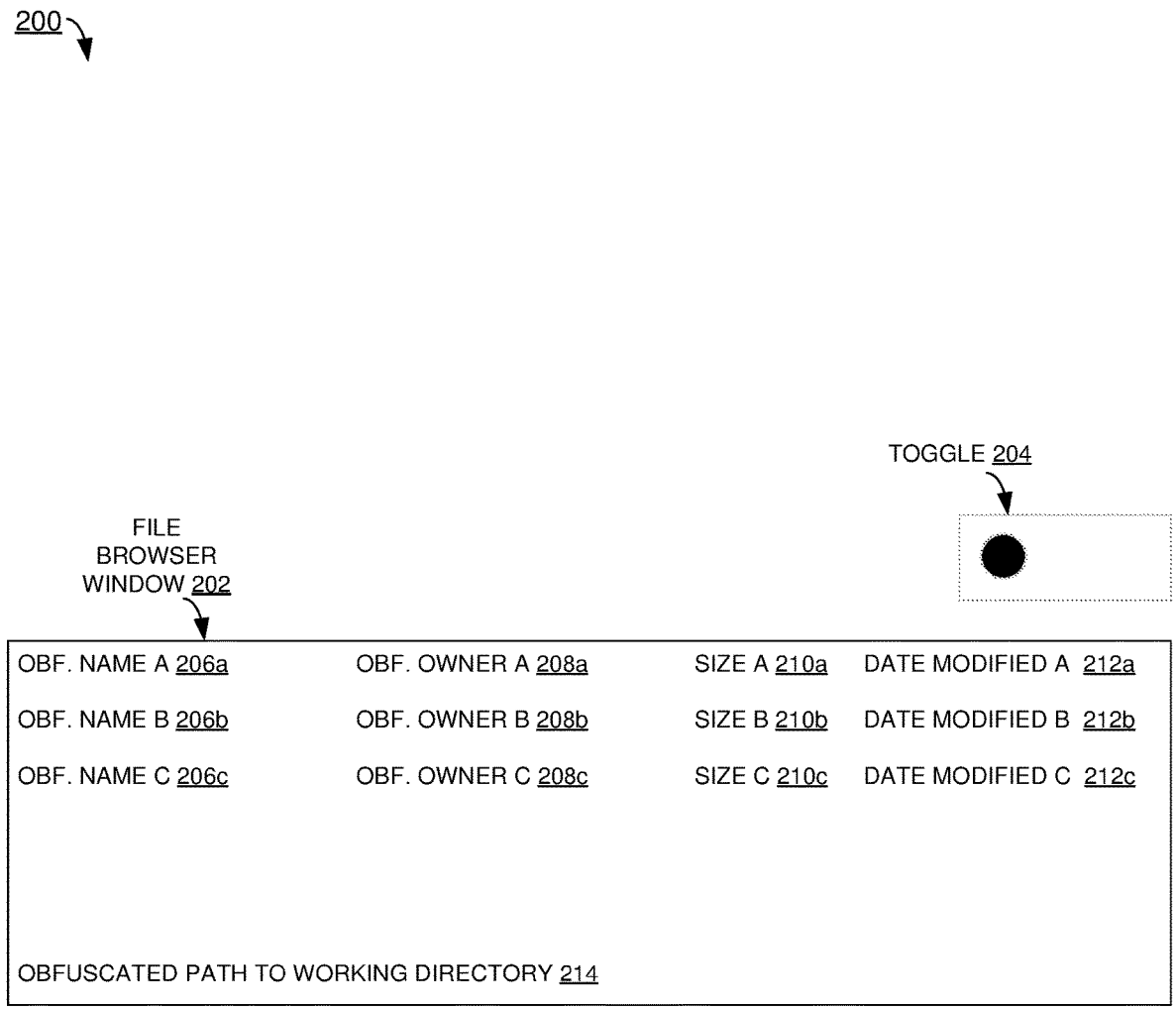
FIG. 2 illustrates an example user interface that can facilitate file system content obfuscation in high security environments, in accordance with an embodiment of this disclosure.
Figure 3:
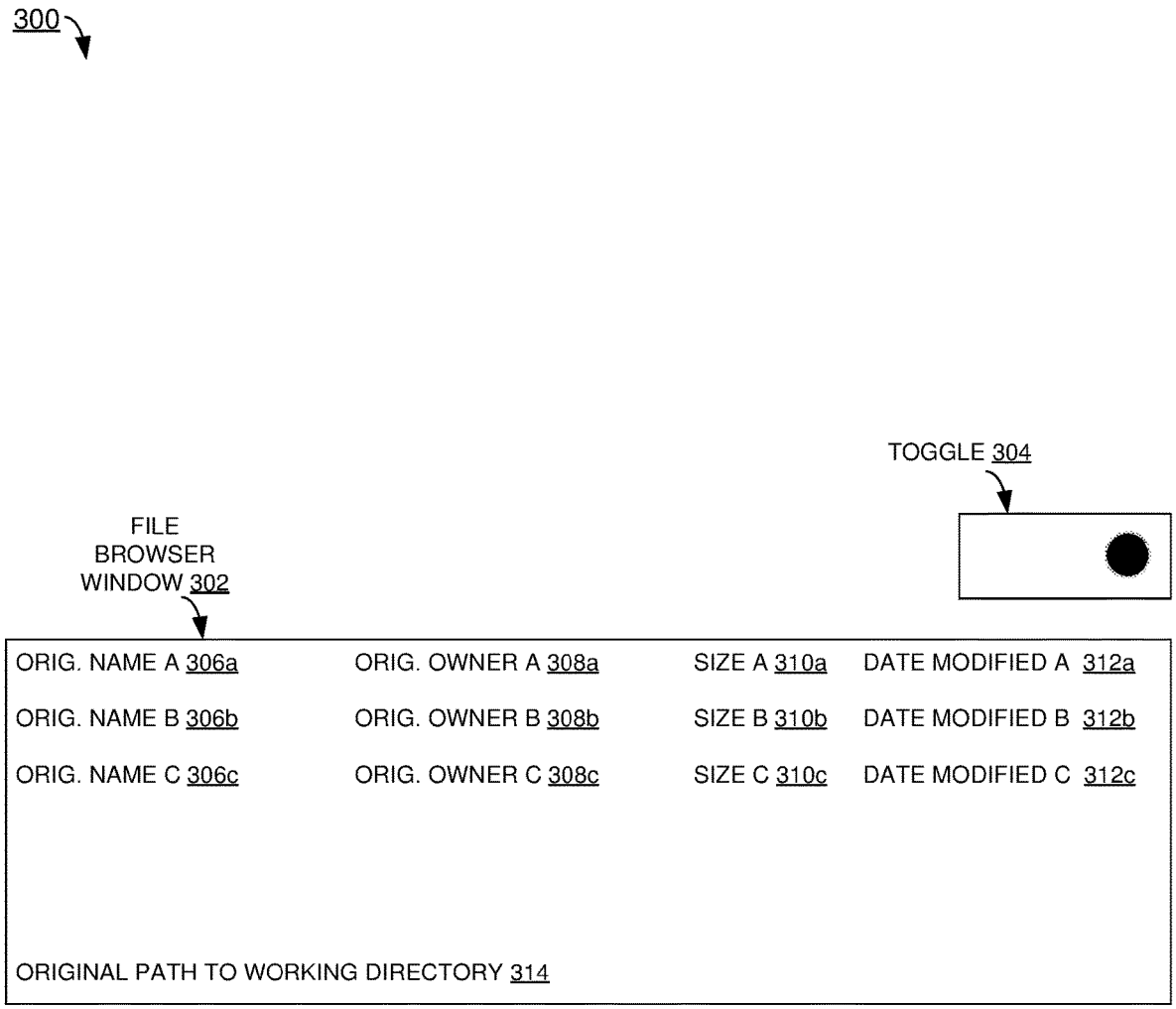
FIG. 3 illustrates an example user interface that can facilitate file system content obfuscation in high security environments, in accordance with an embodiment of this disclosure.
Figure 4:
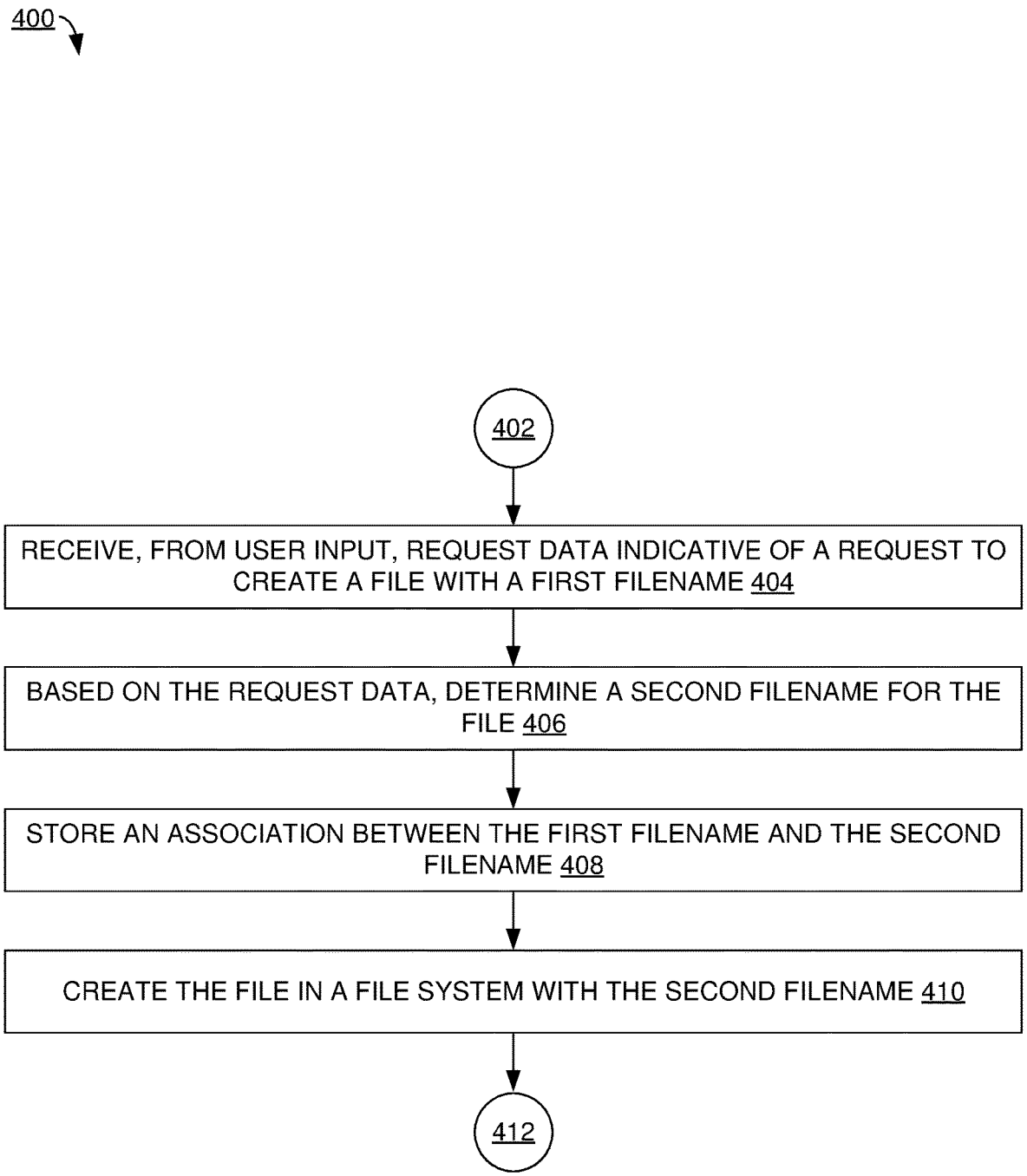
FIG. 4 illustrates an example process flow for file system content obfuscation in high security environments, in accordance with an embodiment of this disclosure.
Figure 9:
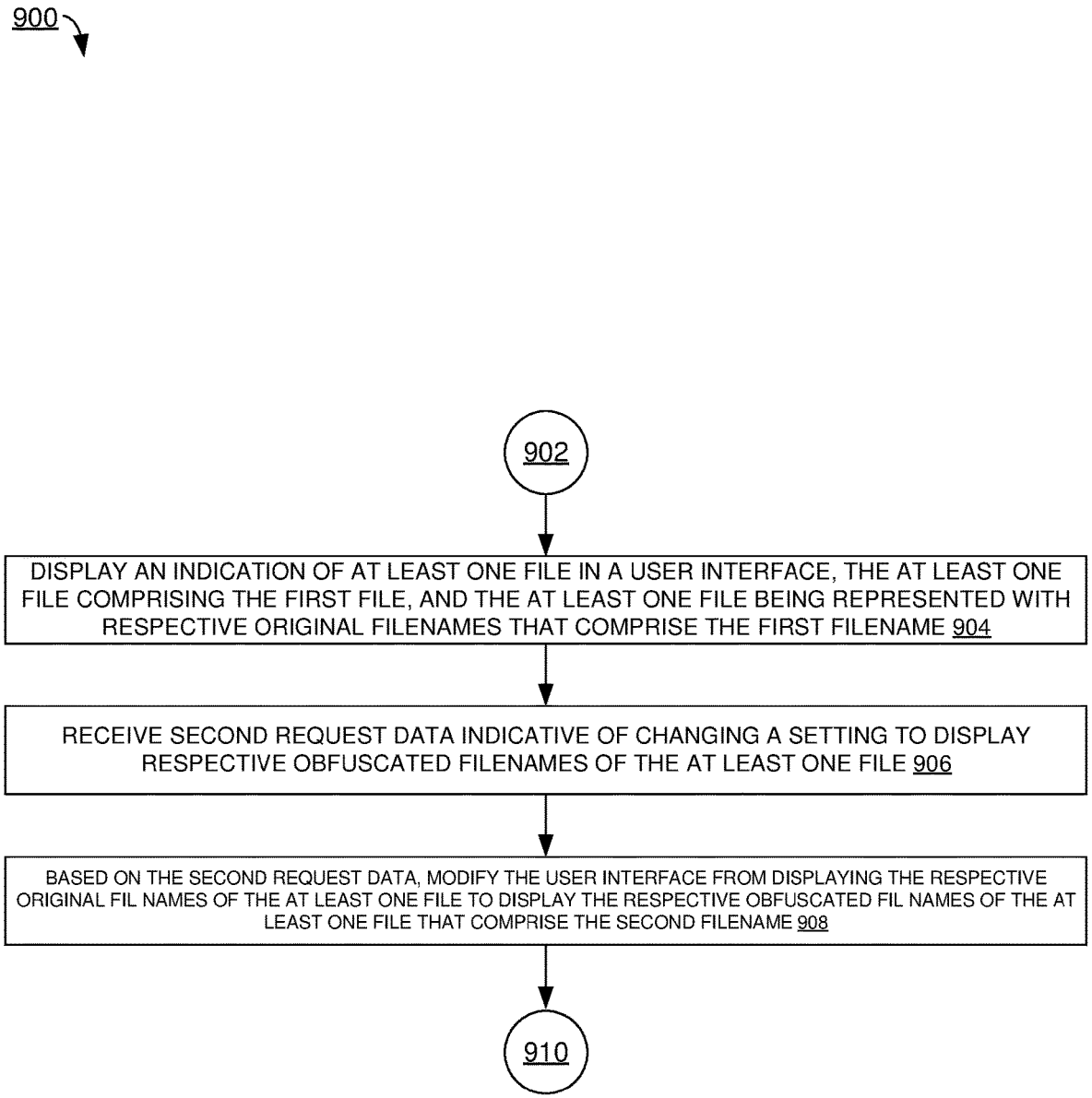
FIG. 9 illustrates an example process flow for switching from displaying original names to displaying obfuscated names that can facilitate file system content obfuscation in high security environments, in accordance with an embodiment of this disclosure.

In the course of implementing file system content obfuscation in high security environments, system architecture 100, including obfuscation system 108 can implement part(s) of user interface 200 of FIG. 2, user interface 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Example User Interfaces

FIG. 2 illustrates an example user interface 200 that can facilitate file system content obfuscation in high security environments, in accordance with an embodiment of this disclosure. In some examples, user interface 200 can be displayed by client 102 of FIG. 1 using information from obfuscation system 108. User interface 200 can show file system information about files in storage system 110 when a setting is configured to use obfuscated names. These obfuscated names can be for items such as files, directories, and owners of files.

As depicted, user interface 200 comprises file browser window 202 and obfuscation toggle 204. In turn, file browser window 202 comprises obfuscated name A 206a, obfuscated name B 206b, obfuscated name C 206C, obfuscated owner A 208a, obfuscated owner B 208b, obfuscated owner C 208c, size A 210a, size B 210b, size C 210c, date modified A 212a, date modified B 212b, date modified C 212c, and obfuscated path to working directory 214.

Obfuscation toggle 204 can be used to configure how to display information about files and directories in file browser window 202. When obfuscation toggle 204 is set to ON (as in user interface 200), then obfuscated filenames (and other information) can be displayed. When an obfuscation toggle is set to OFF (as with obfuscation toggle 304 in user interface 300 of FIG. 3), then original filenames (and other information) can be displayed in a user interface.

Obfuscated name A 206a, obfuscated owner A 208a, size 210a, and date modified A 212a can provide information about a first file; obfuscated name B 206b, obfuscated owner B 208b, size B 210b, and date modified B 212b can provide information about a second file; and obfuscated name C 206c, obfuscated owner C 208c, size C 210c, and date modified C 212c can provide information about a third file. These three files can be stored in the same directory, which can be identified with obfuscated path to working directory 214.

As depicted, some information about files (like name with obfuscated name A 206a, owner with obfuscated owner 208a, and directory with obfuscated path to working directory 214) can be obfuscated, while other information (like size with size A 210a, and date modified with date modified A 212a) is not obfuscated. In some examples, which types of information is to be obfuscated can be configured by a user or administrator.

FIG. 3 illustrates an example user interface 300 that can facilitate file system content obfuscation in high security environments, in accordance with an embodiment of this disclosure. In contrast to the example of user interface 200 of FIG. 2 (which uses obfuscated file information), user interface 300 can show file system information about files in storage system 110 of FIG. 1 when a setting is configured to use original names.

As depicted, user interface 300 comprises file browser window 302 and obfuscation toggle 304. In turn, file browser window 302 comprises original name A 306a, original name B 306b, original name C 306C, original owner A 308a, original owner B 308b, original owner C 308c, size A 310a, size B 310b, size C 310c, date modified A 312a, date modified B 312b, date modified C 312c, and original path to working directory 314.

Obfuscation toggle 304 can be used to configure how to display information about files and directories in file browser window 302. When obfuscation toggle 304 is set to OFF then original filenames (and other information) can be displayed in a user interface.

Original name A 306a, original owner A 308a, size 310a, and date modified A 312a can provide information about a first file; original name B 306b, original owner B 308b, size B 310b, and date modified B 312b can provide information about a second file; and original name C 306c, original owner C 308c, size C 310c, and date modified C 312c can provide information about a third file. These three files can be stored in the same directory, which can be identified with original path to working directory 314.

Example Process Flows

FIG. 4 illustrates an example process flow 400 for file system content obfuscation in high security environments, in accordance with an embodiment of this disclosure. In some examples, one or more embodiments of process flow 400 can be implemented by obfuscation system 108 of FIG. 1, or computing environment 1100 of FIG. 11.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Process flow 400 begins with 402, and moves to operation 404. Operation 404 depicts receiving, from user input, request data indicative of a request to create a file with a first filename. This can comprise a user of client 102 of FIG. 1 providing user input to client 102 to create a file. Client 102 can send an indication of this to obfuscation system 108.

After operation 404, process flow 400 moves to operation 406.

Operation 406 depicts, based on the request data, determining a second filename for the file. Obfuscation system can determine another filename for the file, in addition to the filename specified by the user. That is, the first filename can comprise an original filename, and the second filename can comprise an obfuscated filename.

After operation 406, process flow 400 moves to operation 408.

Operation 408 depicts storing an association between the first filename and the second filename Obfuscation system 108 can store an association between the first filename and the second filename so that when obfuscation system 108 receives a request to perform an operation on a file using the first filename or using the second filename, obfuscation system 108 can identify the correct file (in some examples, operations are performed using the second filename so that the default is to have obfuscated filenames).

In some examples, operation 408 can comprise storing the association between the first filename and the second filename in metadata of the file stored in the file system.

After operation 408, process flow 400 moves to operation 410.

Operation 410 depicts creating the file in a file system with the second filename. This can comprise obfuscation system 108 creating the file in storage system 110 using the second filename as the name for the file in storage system 110.

After operation 410, process flow 400 moves to 412, where process flow 400 ends.

FIG. 5 illustrates another example process flow 500 for file system content obfuscation in high security environments, in accordance with an embodiment of this disclosure. In some examples, one or more embodiments of process flow 500 can be implemented by obfuscation system 108 of FIG. 1, or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 400 of FIG. 4, process flow 600 of FIG. 6, process flow 700 of FIG. 7, process flow 800 of FIG. 8, process flow 900 of FIG. 9, and/or process flow 1000 of FIG. 10.

Process flow 500 begins with 502, and moves to operation 504. Operation 504 depicts, based on receiving user request data indicative of a request to create a file with a first filename, identifying a second filename for the file. In some examples, operation 504 can be implemented in a similar manner as operations 404 and 406 of FIG. 4.

In some examples, operation 504 comprises determining the second filename from a predetermined group of words. That is, word lists can be used as described herein, and the second filename can be drawn from these word lists.

In some examples, the predetermined group of words is a first predetermined group of words, operation 504 comprises selecting the first predetermined group of words from multiple predetermined groups of words that comprise the first predetermined group of words. That is, a user can select which word list(s) to draw upon for filenames from a set of candidate word lists.

After operation 504, process flow 500 moves to operation 506.

Operation 506 depicts storing an association between the first filename and the second filename In some examples, operation 506 can be implemented in a similar manner as operation 408 of FIG. 4.

After operation 506, process flow 500 moves to operation 508.

Operation 508 depicts creating the file in a file system with the second filename. In some examples, operation 508 can be implemented in a similar manner as 410 of FIG. 4.

In some examples, operation 508 comprises displaying, during a first setting, the first filename for the file, a size of data stored in a folder of the file, and a number of files that comprises the file that are stored in the folder, and displaying, during a second setting, the second filename for the file, the size of data stored in the folder, and the number of files that are stored in the folder. That is, a user interface element can be presented on client 102 for toggling between using original names and obfuscated names. In some examples, more information that the filename can be obfuscated, such as a path to a working directory, or a file creator. Then, in some examples, there can be information that is not obfuscated regardless of toggling, such as a size of data stored in a folder that contains the file, or a number of files in the folder.

In some examples, operation 508 comprises displaying an obfuscation of an identifier of an author of the file during the second setting. That is, there can be examples where a file's author or owner is obfuscated when a filename is obfuscated.

In some examples, operation 508 comprises identifying a location in the file system where original filenames are stored for files when created. That is, certain directories or file system locations can be whitelisted from being obfuscated.

In some examples, the file is a first file, and operation 508 comprises determining to store a second file that is an executable application with an original name. That is, applications can be whitelisted from having obfuscated names. A reason for whitelisting certain things from having whitelisted names can be that there may be scripts or applications that have hardcoded references to particular filesystem locations, such as system files. Obfuscating these files can result in those scripts or applications not functioning properly because they cannot access the file via the hardcoded reference.

After operation 508, process flow 500 moves to 510, where process flow 500 ends.

FIG. 6 illustrates another example process flow 600 for file system content obfuscation in high security environments, in accordance with an embodiment of this disclosure. In some examples, one or more embodiments of process flow 600 can be implemented by obfuscation system 108 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 400 of FIG. 4, process flow 500 of FIG. 5, process flow 700 of FIG. 7, process flow 800 of FIG. 8, process flow 900 of FIG. 9, and/or process flow 1000 of FIG. 10.

Process flow 600 begins with 602, and moves to operation 604. Operation 604 depicts, based on receiving data indicative of a request to create a file with a first filename, identifying a second filename for the file. In some examples, operation 604 can be implemented in a similar manner as operations 404 and 406 of FIG. 4.

In some examples, the second filename does not comprise the first filename. That is, there can be examples where obfuscated names are wholly distinct from original names, rather than, e.g., appending a date onto the end of an original filename to produce an obfuscated filename.

After operation 604, process flow 600 moves to operation 606.

Operation 606 depicts storing an association between the first filename and the second filename In some examples, operation 606 can be implemented in a similar manner as operation 408 of FIG. 4.

In some examples, operation 606 comprises encrypting the association between the first filename and the second filename.

After operation 606, process flow 600 moves to operation 608.

Operation 608 depicts creating the file with the second filename In some examples, operation 608 can be implemented in a similar manner as 410 of FIG. 4.

In some examples, the data is first data, and operation 608 comprises receiving second data that identifies the first filename and is indicative of a read operation, identifying the file that is stored with the second filename based on the association between the first filename and the second filename, reading the file based on the identifying of the file. That is, a read operation can be processed when using obfuscated filenames.

In some examples, the data is first data, and operation 608 comprises receiving second data that identifies the first filename and is indicative of an update operation, identifying the file that is stored with the second filename based on the association between the first filename and the second filename, and updating the file based on the identifying of the file. That is, an update operation can be processed when using obfuscated filenames.

In some examples, the data is first data, and operation 608 comprises receiving second data that identifies the first filename and is indicative of a delete operation, identifying the file that is stored with the second filename based on the association between the first filename and the second filename, and deleting the file based on the identifying of the file. That is, a delete operation can be processed when using obfuscated filenames Thus, create-read-update-delete (CRUD) operations can be processed when using obfuscated filenames.

After operation 608, process flow 600 moves to 610, where process flow 600 ends.

FIG. 7 illustrates an example process flow 700 for displaying original names that can facilitate file system content obfuscation in high security environments, in accordance with an embodiment of this disclosure. In some examples, one or more embodiments of process flow 700 can be implemented by obfuscation system 108 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 400 of FIG. 4, process flow 500 of FIG. 5, process flow 600 of FIG. 6, process flow 800 of FIG. 8, process flow 900 of FIG. 9, and/or process flow 1000 of FIG. 10.

Process flow 700 begins with 702, and moves to operation 704. Operation 704 depicts receiving second request data indicative of display names of at least one file in the file system, the at least one file comprising the first file. That is, client 102 of FIG. 1 can attempt to display information about files stored in storage system 110. For instance, this can be an attempt to display a file browser window that displays information about files, such as names, last modified times, and sizes, for files in a given directory. This request can be sent from client 102 to obfuscation system 108.

After operation 704, process flow 700 moves to operation 706.

Operation 706 depicts determining that a setting is configured to display original filenames That is, the setting can be a user toggleable setting at client 102 that toggles between displaying original filenames and displaying obfuscated filenames. Obfuscation system 108 can determine that the setting is set for displaying original filenames.

In some examples, the setting is configurable in response to user input indicative of one of displaying original filenames that comprise the first filename and displaying obfuscated filenames that comprise the second filename. That is, there can be a user-toggleable setting of whether to display original names or obfuscated names.

After operation 706, process flow 700 moves to operation 708.

Operation 708 depicts, in response to the determining, retrieving an identifier of the first file, and identifying the first filename based on the association between the first filename and the second filename. That is, storage system 110 can store files using the second filename, which can be obfuscated filenames. Obfuscation system 108 can retrieve this information from storage system 110 and then use a stored association between the first filename and the second filename to determine that the first filename is the original filename. Obfuscation system 108 can send this information, including the first filename, to client 102.

After operation 708, process flow 700 moves to operation 710.

Operation 710 depicts displaying the first filename as part of displaying the display names of the at least one file. This can comprise client 102 displaying the file information received from obfuscation system 108.

After operation 710, process flow 700 moves to 712, where process flow 700 ends.

FIG. 8 illustrates an example process flow 800 for displaying obfuscated names that can facilitate file system content obfuscation in high security environments, in accordance with an embodiment of this disclosure. In some examples, one or more embodiments of process flow 800 can be implemented by obfuscation system 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 400 of FIG. 4, process flow 500 of FIG. 5, process flow 600 of FIG. 6, process flow 700 of FIG. 7, process flow 900 of FIG. 9, and/or process flow 1000 of FIG. 10.

Process flow 800 begins with 802, and moves to operation 804. Operation 804 depicts receiving second request data indicative of display names of at least one file in the file system, the at least one file comprising the first file. In some examples, operation 804 can be implemented in a similar manner as operation 704 of FIG. 7.

After operation 804, process flow 800 moves to operation 806.

Operation 806 depicts determining that a setting is configured to display obfuscated filenames. In some examples, operation 806 can be implemented in a similar manner as operation 704 of FIG. 7, but where the setting is configured to display obfuscated filenames rather than original filenames.

After operation 806, process flow 800 moves to operation 808.

Operation 808 depicts, in response to the determining, determining to display the second filename for the file rather than the first filename for the file. This can obfuscation system 108 of FIG. 1 determining to display obfuscated filenames rather than original filenames.

After operation 808, process flow 800 moves to operation 810.

Operation 810 depicts retrieving an identifier of the first file. This can comprise obfuscation system 108 of FIG. 1 retrieving the identifier for the first file from storage system 110.

After operation 810, process flow 800 moves to operation 812.

Operation 812 depicts displaying the second filename as part of displaying the display names of the at least one file. This can comprise obfuscation system 108 of FIG. 1 sending information about the first file to client 102, which displays the information in a user interface.

After operation 812, process flow 800 moves to 814, where process flow 800 ends.

FIG. 9 illustrates an example process flow 900 for switching from displaying original names to displaying obfuscated names that can facilitate file system content obfuscation in high security environments, in accordance with an embodiment of this disclosure. In some examples, one or more embodiments of process flow 900 can be implemented by obfuscation system 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, and/or process flow 1000 of FIG. 10.

Process flow 900 begins with 902, and moves to operation 904. Operation 904 depicts displaying an indication of at least one file in a user interface, the at least one file comprising the first file, and the at least one file being represented with respective original filenames that comprise the first filename That is, client 102 can display a file browser window with information about files contained in a directory, and this information can include original filenames.

After operation 904, process flow 900 moves to operation 906.

Operation 906 depicts receiving second request data indicative of changing a setting to display respective obfuscated filenames of the at least one file. There can be a user interface toggle displayed by client 102 that can be invoked between toggling between displaying original filenames and obfuscated filenames. In operation 906, this user interface element can be engaged to switch from displaying original filenames to displaying obfuscated filenames.

After operation 906, process flow 900 moves to operation 908.

Operation 908 depicts, based on the second request data, modifying the user interface from displaying the respective original filenames of the at least one file to displaying the respective obfuscated filenames of the at least one file that comprise the second filename Obfuscation system 108 can send client 102 updated information about the files being displayed, and this updated information can include obfuscated filenames.

After operation 908, process flow 900 moves to 910, where process flow 900 ends.

FIG. 10 illustrates an example process flow 1000 for switching from displaying obfuscated names to displaying original names that can facilitate file system content obfuscation in high security environments, in accordance with an embodiment of this disclosure. In some examples, one or more embodiments of process flow 1000 can be implemented by obfuscation system 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, and/or process flow 900 of FIG. 9.

Process flow 1000 begins with 1002, and moves to operation 1004. Operation 1004 depicts displaying an indication of at least one file in a user interface, the at least one file comprising the first file, and the at least one file being represented with respective obfuscated filenames that comprises the second filename In some examples, operation 1004 can be implemented in a similar manner as operation 904 of FIG. 9, where obfuscated filenames are displayed in operation 1004 compared to original filenames in operation 904.

After operation 1004, process flow 1000 moves to operation 1006.

Operation 1006 depicts receiving second request data indicative changing a setting to display respective original filenames of the at least one file. In some examples, operation 1006 can be implemented in a similar manner as operation 906 of FIG. 9, where the setting is toggled to display original filenames in operation 1006 compared to the setting being toggled to display obfuscated filenames in operation 906.

After operation 1006, process flow 1000 moves to operation 1008.

Operation 1008 depicts based on the second request data, modifying the user interface from displaying the respective obfuscated filenames of the at least one file to displaying the respective original filenames of the at least one file that comprise the first filename. In some examples, operation 1008 can be implemented in a similar manner as operation 908 of FIG. 9, where original filenames are displayed in operation 1006 compared to obfuscated filenames being displayed in operation 906.

After operation 1008, process flow 1000 moves to 1010, where process flow 1000 ends.

Example Operating Environment

Figure 11:
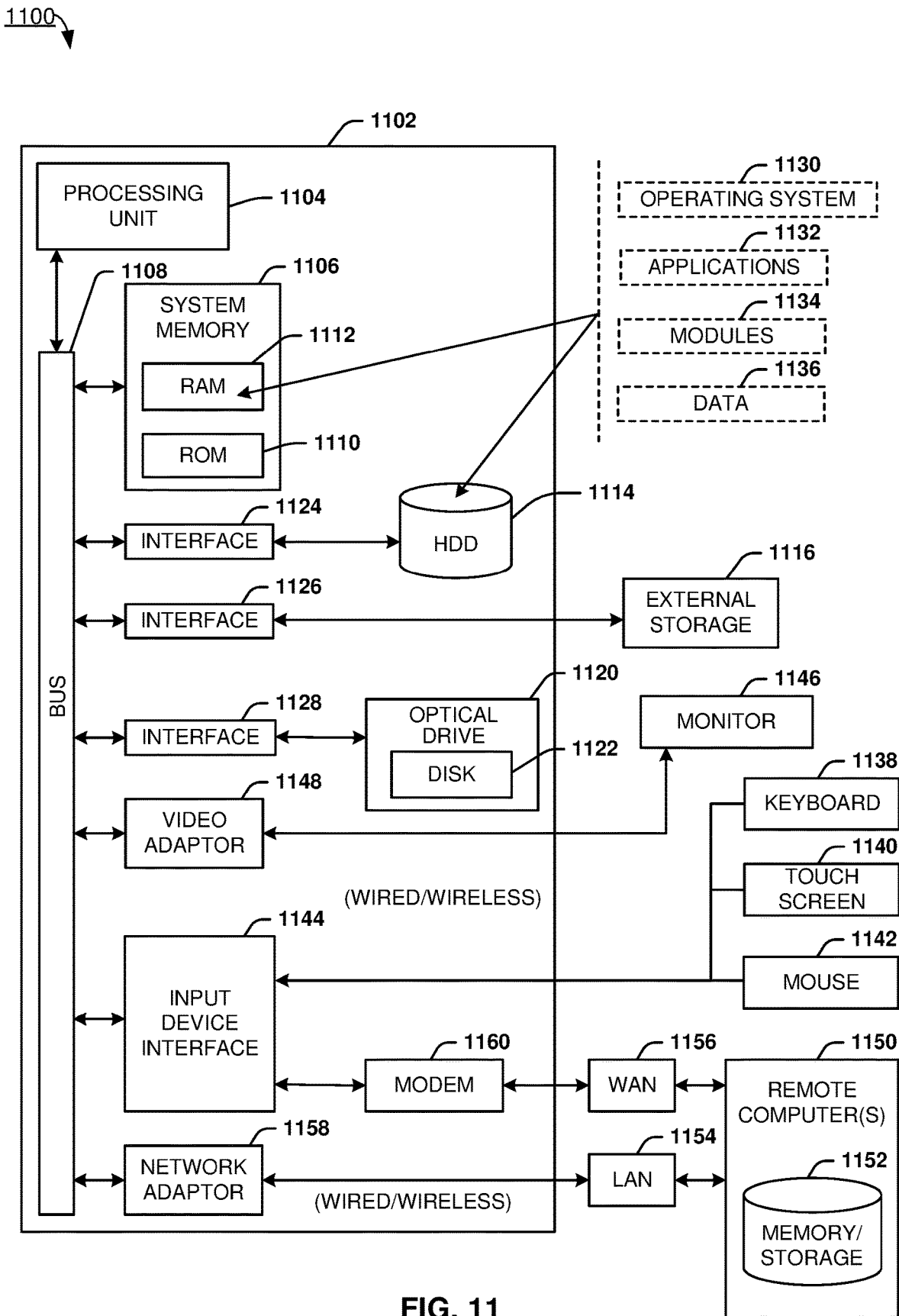
FIG. 11 illustrates an example block diagram of a computer operable to execute an embodiment of this disclosure.

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of system architecture 100 of FIG. 1.

In some examples, computing environment 1100 can implement one or more embodiments of the process flows of FIGS. 5-11 to facilitate file system content obfuscation in high security environments.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising: a processor; and a memory that stores executable instructions that, when executed by the processor, facilitate performance of operations, comprising: receiving, from user input, request data indicative of a request to create a file with a first filename; based on the request data, determining a second filename for the file; storing an association between the first filename and the second filename; creating the file in a file system with the second filename; displaying, during a first setting, the first filename for the file, a size of data stored in a folder of the file, and a number of files that is stored in the folder that comprises the file; and displaying, during a second setting, the second filename for the file, the size of data stored in the folder, and the number of files that is stored in the folder.

2. The system of claim 1, wherein the request data is first request data, wherein the file is a first file, and wherein the operations further comprise:
   receiving second request data indicative of displaying names of at least one file in the file system, the at least one file comprising the first file;
   determining that a setting is configured to display original filenames, wherein the setting is the first setting;
   in response to the determining,
      retrieving an identifier of the first file, and
      identifying the first filename based on the association between the first filename and the second filename; and
   displaying the first filename as part of displaying the display names of the at least one file, during the first setting.

3. The system of claim 2, wherein the user input is first user input, and wherein the setting is configurable in response to second user input indicative of one of the first setting of displaying original filenames that comprise the first filename and the second setting of displaying obfuscated filenames that comprise the second filename.

4. The system of claim 1, wherein the request data is first request data, wherein the file is a first file, and wherein the operations further comprise:
   receiving second request data indicative of display names of at least one file in the file system, the at least one file comprising the first file;
   determining that a setting is configured to display obfuscated filenames, wherein the setting is the second setting;
   in response to the determining, determining to display the second filename for the file rather than the first filename for the file;
   retrieving an identifier of the first file; and
   displaying the second filename as part of displaying the display names of the at least one file, during the second setting.

5. The system of claim 1, wherein the request data is first request data, wherein the file is a first file, and wherein the operations further comprise:
   displaying an indication of at least one file in a user interface, the at least one file comprising the first file, and the at least one file being represented with respective original filenames that comprise the first filename;
   receiving second request data indicative of changing a setting from the first setting to the second setting to display respective obfuscated filenames of the at least one file; and
   based on the second request data, modifying the user interface from displaying the respective original filenames of the at least one file to displaying the respective obfuscated filenames of the at least one file that comprise the second filename.

6. The system of claim 1, wherein the request data is first request data, wherein the file is a first file, and wherein the operations further comprise:
   displaying an indication of at least one file in a user interface, the at least one file comprising the first file, and the at least one file being represented with respective obfuscated filenames that comprises the second filename;
   receiving second request data indicative changing a setting from the second setting to the first setting to display respective original filenames of the at least one file; and
   based on the second request data, modifying the user interface from displaying the respective obfuscated filenames of the at least one file to displaying the respective original filenames of the at least one file that comprise the first filename.

7. The system of claim 1, wherein the operations further comprise:
   storing the association between the first filename and the second filename in metadata of the file stored in the file system.

8. A method, comprising:
   based on receiving user request data indicative of a request to create a file with a first filename, identifying, by a system comprising a processor, a second filename for the file;
   storing, by the system, an association between the first filename and the second filename;
   creating, by the system, the file in a file system with the second filename;

displaying, by the system and during a first setting, the first filename for the file, a size of data stored in a folder of the file, and a number of files, comprising the file, that is stored in the folder; and displaying, by the system and during a second setting, the second filename for the file, the size of data stored in the folder, and the number of files that is stored in the folder.

9. The method of claim 8, further comprising:
determining the second filename from a predetermined group of words.

10. The method of claim 9, wherein the predetermined group of words is a first predetermined group of words, and further comprising:
selecting the first predetermined group of words from multiple predetermined groups of words that comprise the first predetermined group of words.

11. The method of claim 10, further comprising:
displaying, by the system, an obfuscation of an identifier of an author of the file during the second setting.

12. The method of claim 8, further comprising:
identifying, by the system, a location in the file system where original filenames are stored for files when created.

13. The method of claim 8, wherein the file is a first file, and further comprising:
determining, by the system, to store a second file that is an executable application with an original name.

14. A non-transitory computer-readable medium comprising instructions that, in response to execution, cause a system comprising a processor to perform operations, comprising:
based on receiving data indicative of a request to create a file with a first filename, identifying a second filename for the file;
storing an association between the first filename and the second filename;
creating the file with the second filename;
displaying, during a first setting, the first filename for the file, a size of data stored in a folder of the file, and a number of files, stored in the folder, that comprise the file; and
displaying, during a second setting, the second filename for the file, the size of data stored in the folder, and the number of files stored in the folder.

15. The non-transitory computer-readable medium of claim 14, wherein the data is first data, and wherein the operations further comprise:
receiving second data that identifies the first filename and is indicative of a read operation;
identifying the file that is stored with the second filename based on the association between the first filename and the second filename; and
reading the file based on the identifying of the file.

16. The non-transitory computer-readable medium of claim 14, wherein the data is first data, and wherein the operations further comprise:
receiving second data that identifies the first filename and is indicative of an update operation;
identifying the file that is stored with the second filename based on the association between the first filename and the second filename; and
updating the file based on the identifying of the file.

17. The non-transitory computer-readable medium of claim 14, wherein the data is first data, and wherein the operations further comprise:
receiving second data that identifies the first filename and is indicative of a delete operation;
identifying the file that is stored with the second filename based on the association between the first filename and the second filename; and
deleting the file based on the identifying of the file.

18. The non-transitory computer-readable medium of claim 14, wherein the second filename does not comprise the first filename.

19. The non-transitory computer-readable medium of claim 14, wherein the operations further comprise:
encrypting the association between the first filename and the second filename.

20. The system of claim 1, wherein the operations further comprise:
displaying an obfuscation of an identifier of an author of the file during the second setting.

\* \* \* \* \*